United States Patent [19]
Phillips et al.

[11] Patent Number: 5,217,172
[45] Date of Patent: Jun. 8, 1993

[54] FILM EXTRACTION SYSTEM

[76] Inventors: David Phillips, 2340 Plaza Del Amo, Ste. 225, Torrance, Calif. 90501; Mark Mahurien, 4111 W. 165th St., Lawndale, Calif. 90260

[21] Appl. No.: 854,590

[22] Filed: Mar. 20, 1992

[51] Int. Cl.$^5$ .............................................. B02C 23/00
[52] U.S. Cl. .................................. 241/30; 241/101.2; 241/242; 242/55; 242/58
[58] Field of Search .................. 241/30, 242, 101.2; 242/55, 58, 195; 19/58

[56] References Cited

U.S. PATENT DOCUMENTS

| | | | |
|---|---|---|---|
| 1,426,687 | 8/1922 | Vardell | 19/58 |
| 4,028,779 | 6/1977 | Shah | 241/242 |
| 4,243,186 | 1/1981 | Peter et al. | 242/195 |
| 4,485,981 | 12/1984 | Krywiczamin et al. | 242/58 X |
| 4,775,905 | 10/1988 | Kosugi et al. | 242/195 X |

Primary Examiner—Douglas D. Watts
Attorney, Agent, or Firm—Charles H. Thomas

[57] ABSTRACT

A vacuum system is provided for extracting film, such as microfilm, from reusable film cassettes. Microfilm which is wound on reels that are housed within the cassette casings can be rapidly withdrawn for shredding or for other use or disposal. One or more cassettes is positioned on a support for the cassette cases such that the axis of the reel within the cassette is vertical. A reel support projects upwardly from the case support so that the reel is lifted very slightly within the cassette case and does not rest upon the case. The accessible end of the microfilm on the outside of the reel is led to a vacuum source which applies a vacuum to the film. The reel is freely rotatable atop the reel support within the cassette so that the vacuum is able to draw the entire length of film off of the reel and out of the case through the film access opening. The microfilm is then normally shredded using conventional means.

9 Claims, 2 Drawing Sheets

FILM EXTRACTION SYSTEM

BACKGROUND OF THE INVENTION

1. Field of the Invention

The present invention relates to a method and apparatus for extracting film from a cassette to allow reuse of the cassette. The invention has particular applicability for use with microfilm.

2. Description of the Prior Art

Film, and particularly microfilm, is used extensively in the recordation of voluminous financial transactions. It is the widespread practice of virtually all financial institutions to make a microfilm copy of each check, draft, money order or other negotiable instrument except currency that is deposited in any bank or savings and loan account. The microfilm copies of these documents are kept for a time for use in reconstructing or verifying transactions where questions concerning those transactions arise. After a time, however, the microfilm copies are destroyed since their indefinite retention would impose intolerable storage space requirements.

The microfilm records of documents involved in financial transactions are typically stored on lengths of microfilm in cassettes which are recycled and reused. Each reusable microfilm cassette is typically constructed of an outer case, which often may be formed of molded plastic sections held together by fasteners, such as screws to define an enclosure therewithin. The outer case normally has a laterally directed side opening which provides access to a microfilm reel housed and captured within the case. A reel drive access opening is defined in the bottom or underside of the case. This reel drive access opening allows the reel to be turned by means of driving pins on a reel drive element in order to advance the microfilm.

One end of each length of microfilm is releasably secured to a reel through the microfilm access opening in the case, and the microfilm is drawn onto the reel by rotating the reel with the driving element as microfilm photographs are taken of negotiable instruments in financial transactions. The microfilm is then wound on the reel and stored within the cassette case until required for viewing, or until storage of the tape is no longer desired.

In order to allow reuse of the microfilm cassettes, the lengths of obsolete or outdated microfilm stored therein must be physically removed from the cassettes. In the past this task has been performed manually. That is, individuals have been employed to physically pull the lengths of microfilm off of the reels and out of the cassette cases. An individual can withdraw 200 feet of film from a cassette in a period of about five minutes. While this does not represent a great period of time for withdrawing a single tape from a single cassette, the huge volume of cassettes which are required and which must be stripped of tape make the task a very time consuming project in the aggregate.

SUMMARY OF THE INVENTION

The present invention is directed to a system for extracting film, such as microfilm, from a reusable cassette in a mere fraction of the time required by conventional means. The present invention employs a vacuum system by means of which microfilm is withdrawn from a reel located within a cassette and deposited in a collection chamber. One microfilm cassette with which the system of the invention can be employed is a cassette or cartridge manufactured by 3M Corporation and described in U.S. Pat. No. 3,150,840. Two hundred linear feet of microfilm can be withdrawn from a cassette of this type using the vacuum extraction system of the invention in only approximately six seconds. Furthermore, the vacuum extraction system of the invention can be applied to a plurality of cassettes concurrently. This reduces the average microfilm extraction time even further.

In one broad aspect the present invention may be considered to be an apparatus for extracting film from a cassette containing a reel upon which a length of film is wound and disposed within a case having a film access opening and a reel drive access opening therein. The apparatus of the invention is comprised of a case support means for supporting the case from beneath such that the axis of the reel is vertical, and a reel support means for supporting the reel within the case through the reel drive access opening so that the reel does not rest upon the case. A vacuum means is also provided for applying a vacuum to the film so as to draw the length of film off of the reel and out of the case through the film access opening. The reel is thereby rotated atop the reel support means within the case.

In another broad aspect the invention may be considered to be a method of extracting film from a cassette which has a length of film wound on a reel that is disposed in a case having a film access opening therein. According to the method the case is mounted atop a case support such that the axis of the reel is vertical. The reel is elevated within the case such that the reel does not rest on the case and a vacuum is exerted on the film, thereby drawing the film out of the case through the film access opening and rotating the reel. The method has particular applicability to the extraction of microfilm from a reusable cassette. The microfilm is normally pulled into an enclosure by means of the vacuum and shredded within the enclosure.

The invention may be described with greater clarity and particularity by reference to the accompanying drawings.

DESCRIPTION OF THE EMBODIMENT AND IMPLEMENTATION OF THE METHOD

Figure 1:
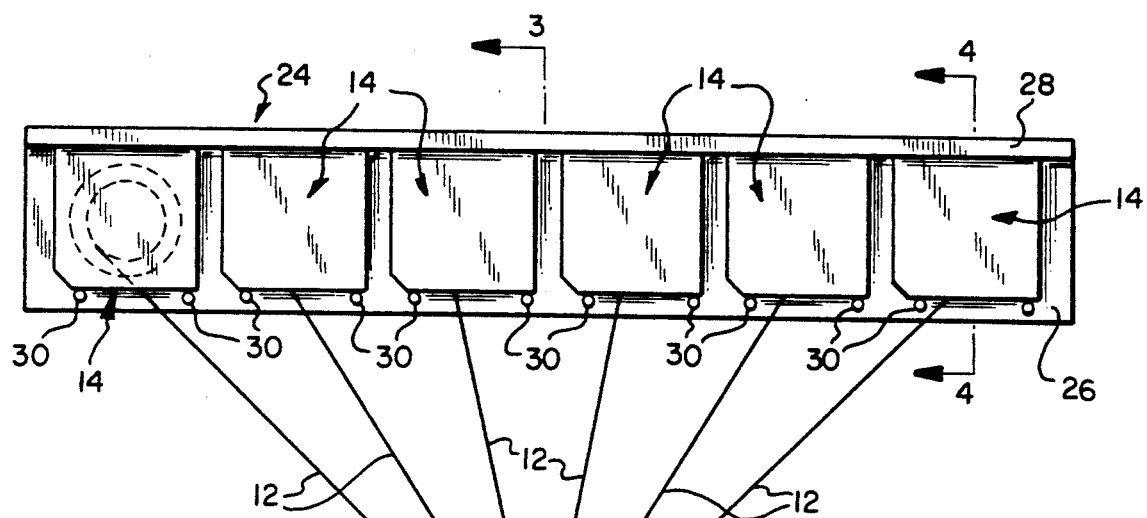
FIG. 1 is a top plan view of an apparatus for extracting microfilm concurrently from a plurality of reusable cassettes.

FIG. 1 depicts an apparatus indicated generally at 10 for extracting lengths of microfilm 12 from a plurality of identical, reusable cassettes 14. The cassettes 14 are each of the type disclosed in U.S. Pat. No. 3,150,840. Each cassette 14 contains a reel 16, visible in FIG. 4 upon which a length of microfilm 12 is wound. Each reel 16, with a length of microfilm 12 wound thereon, is disposed within a surrounding rigid plastic case 18. The plastic case 18 has a laterally facing film access opening 20 in its front and a reel drive access opening 22 in its bottom or underside.

Each reel 16 located within each cassette 14 is comprised of a winding drum 32 located between a pair of opposing parallel, annular side retainers 34. The drum 32 and retainers 34 are constructed of plastic. A metal partition 36 extends across the central circular opening at the interior of the drum 32 and is press fit into a radial groove defined therein. The partition 36 has four equally spaced apertures defined therein and is provided for the purpose of receiving pins of a reel drive element for driving the reel in rotation.

The drum 32 is also provided with an outwardly directed slot from which a plastic fastening tab (not shown) extends radially outwardly. The plastic tab is provided for attaching a length of microfilm 12 to the reel 16. Each length of microfilm 12 is attached by adhesive tape to a radially projecting fastening tab on the drum 32, and each length of microfilm 12 is wound onto a reel 16.

The reel 16 is mounted for rotation within a generally disk-shaped cavity 38 that is defined within the case 14. The case 14 is formed of a pair of mating, molded mating upper and lower plastic sections depicted at 40 and 42, respectively, in FIG. 4. The molded plastic sections 40 and 42 both have a generally rectangular outer configuration and each has a generally circular interiorally directed partition therewithin. These interior partitions meet when the case sections 40 and 42 are placed together and define the confines of the disk-shaped cavity 38. When the lengths of microfilm 12 are stored, they are each carried on a reel 16 and protected in the cavity 38 defined within the shell formed by the upper and lower case portions 40 and 42 of the cassette case 18.

Aligned gaps in both the interior cylindrical partitions and in the outer walls of the upper and lower case sections 40 and 42 define the film access opening 20. The transverse surface of the upper case section 40 is solid, but a central, circular reel drive access opening 22 is defined in the lower casing section 42. The reel drive access opening 22 is provided in the cassette 14 so as to allow a reel drive mechanism to engage the apertures in the transverse metal partition 36 of the reel 16.

The apparatus 10 is comprised of a means for concurrently supporting the cases 18 of a plurality of different cassettes 14. The case support 24 is of an L-shaped configuration in cross section, as illustrated in FIG. 4, and has a flat, horizontally disposed shelf 26 that extends outwardly from an upright back wall 28.

Six separate cassette mounting positions are defined on the shelf 26 of the case support 24 to receive six cassettes 14, positioned side by side as illustrated in FIG. 1. At each cassette position there are a pair of metal pins 30 projecting upwardly from the shelf 26 in spaced separation from the forwardly facing surface of the case back wall 28. The pins 30 are spaced from the wall 28 a distance just sufficient to accept a cassette 14. Each of the cassettes 14 is typically about four inches square and one inch thick. Accordingly, the pins 30 are spaced from the back wall 28 a distance just slightly greater than four inches. The pins 30 serve as restraining devices to prevent the cassettes 14 from being pulled off of the shelf 26 when the lengths of microfilm 12 are withdrawn therefrom.

Figure 4:
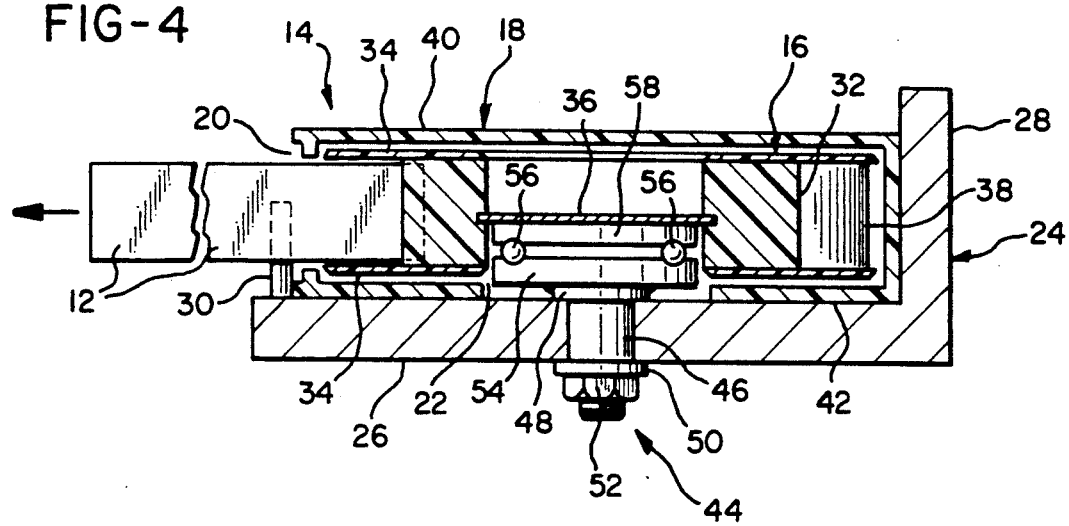
FIG. 4 is a side sectional detail taken along the lines 4—4 of FIG. 1.

The microfilm extracting apparatus 10 of the invention also includes a plurality of reel support devices, one of which is indicated generally at 44 in FIG. 4. A reel support device 44 is provided for each of the six cassette positions beneath the six cassettes 14 shown in FIG. 1. Each reel support device 44 is formed with an upstanding post 46 that projects upwardly through a vertically oriented opening in the shelf 26. The post 46 has an upper shoulder 48 having a diameter greater than the post opening. The shoulder 48 seats atop the upper surface of the shelf 26, and the reel support device 44 is secured to the shelf 26 by means of a washer 50 and a nut 52. The nut 52 is threadably engaged on the externally threaded tip of the post 46.

Above the shoulder 48 the reel support device 44 has a horizontally disposed, disk-shaped bearing assembly that projects up from the case supporting shelf 26. The bearing assembly of the reel support device 44 includes a flat, disk-shaped base 54 having depressions on its upper surface adapted to receive ball bearings 56. The ball bearings 56 are disposed atop the base 54 and fit into a corresponding annular track in the underside of a disk-shaped turntable 58 that is located atop the bearings 56. The turntable 58 is thereby freely rotatable relative to the base 54.

Figure 3:
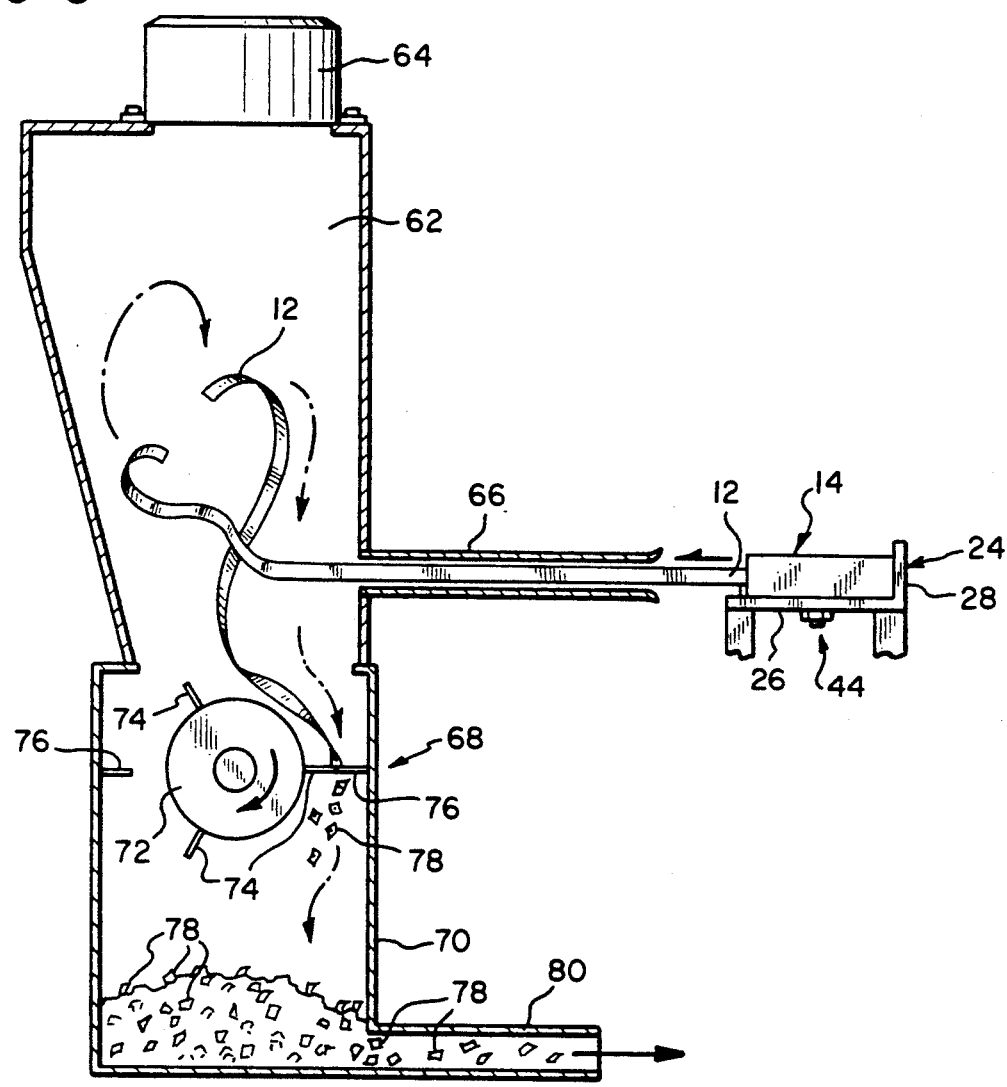
FIG. 3 is a side elevational sectional view taken along the lines 3—3 of FIG. 1.

The microfilm extracting apparatus 10 also includes a hollow, thin walled, generally box shaped structure 60 that defines a hollow plenum 62 therewithin. The structure 60 has an opening at its top atop which an electrically driven three horsepower vacuum motor 64 is located. An opening is also defined in the side of the structure 60 to receive a hollow, cylindrical lead-in tube or pipe 66 that is located at the same elevation as the microfilm cassettes 14. The lead-in tube 66 is directed toward the cassette case support 24, as illustrated in FIGS. 1 and 3. The vacuum motor 64 applies a suction or vacuum through the plenum 62 to the lead in tube 66.

The plenum housing 60 is disposed atop a conventional microfilm shredding device indicated generally at 68. The microfilm shredder 68 has a hollow, box shaped enclosure 70 within which a motor driven shredding drum 72 is mounted. The drum 72 has a plurality of radially directed shredding blades 74 which pass in close proximity to a pair of slicing ledges 76. As the blades 74 rotate past the slicing ledges 76, they sever any portions of lengths of microfilm 12 that come between the shredding blades 74 and the slicing ledges 76. Beneath the shredding drum 72 there is a cavity adapted to receive shredded particles or chips 78 of microfilm. An exhaust outlet 80 is provided to withdraw the shredded microfilm chips 78 for disposal.

To extract the microfilm lengths 12 from the cassettes 14 according to the invention, the cassettes 14 are first positioned atop the shelf 26 of the case support 24 with one cassette 14 being located at each of the six cassette positions. The cassettes 14 are inserted between the back wall 28 and the pairs of retaining pins 30 such that the microfilm access openings 20 all face outwardly in the direction of the tube 66. The cassettes 14 are inserted so that the cases 18 thereof are restrained from being pulled off the shelf 26 by means of the retaining pins 30. When the cassettes 14 are placed on the shelf 26 at the cassette positions, the axes of the reels 16 within the cases 18 are respectively aligned and coincident with the corresponding axes of the reel support devices 44.

When the cassettes 14 are in position side by side as illustrated in FIG. 1 with the lower case portions 42 resting on the shelf 26, the turntables 58 of the reel support devices 44 will press upwardly against the partitions 36 of the microfilm reels 16, thereby slightly elevating the reels 16 above the shelf 26 such that the lowermost side retainer 34 of each reel 16 does not rest upon the lower section 42 of its case 18. Rather, the reels 16 are elevated very slightly within the cavities 38 and are supported from beneath by the turntables 58 atop which the reel partitions 36 rest. The reels 16 thereby "float" within the plastic cases 18. The reels 16 and turntables 58 will thereby rotate freely together about the common vertical axes of the reels 16 and reel support devices 44.

The vacuum motor 64 is then turned on so that suction is exerted through the plenum 62 and through the lead-in tube 66. The exposed ends of the lengths of microfilm 12 are then manually drawn out of the microfilm access openings 20 in the cassettes 14 and are inserted into the lead-in tube 66 a distance of perhaps three or four inches. At this point the vacuum which is applied to the lengths of microfilm 12 is sufficient to begin rapidly pulling the remainder of the lengths of microfilm 12 out of the cases 18 through the microfilm access openings 20 and off of the reels 16 while rotating the reels 16 about their own vertical axes.

As each exposed end of a length of microfilm 12 is inserted into the lead-in tube 66, the suction applied will draw the entire remaining length of microfilm 12 entirely off of the reel 16 upon which it was previously wound. The vacuum suction is sufficient to break the adhesive tape bond at the interior end of the length of microfilm 12, so that the entire length of microfilm 12 is pulled free from the plastic tab projecting from the drum 32 to which it was previously attached.

Figure 2:
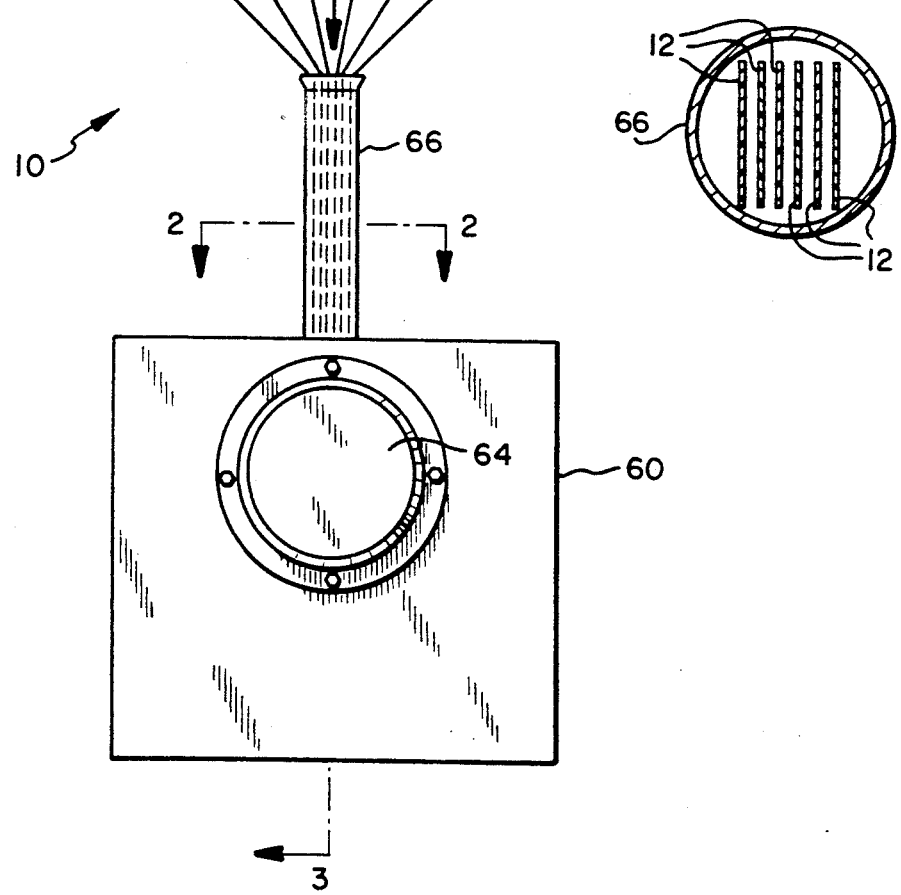
FIG. 2 is a sectional elevational detail taken along the lines 2—2 of FIG. 1.

When all of the accessible ends of the six different lengths of microfilm 12 have been inserted into the lead-in tube 66, the several lengths of microfilm 12 will be drawn through the lead-in tube 66 side by side by means of the suction thereon, as illustrated in FIG. 2. In order for the reels 16 to turn freely enough to allow the vacuum source to withdraw the lengths of microfilm 12 off of the drums 32 of the reels 16, it is necessary for the reels 16 to be lifted sufficiently within the cavities 38 so that the reels 16 do not rest upon the cases 18.

Once the lengths of microfilm 12 enter the plenum 62 they drop by gravity onto the shredder drum 72 of the shredding machine 68. The lengths of microfilm 12 are then carried by the shredder drum 72 and sliced into small chips 78 by the shredder blades 74 acting against the slicing ledges 76. The pile of shredded microfilm chips 78 at the bottom of the chamber 70 can then be withdrawn through the outwardly directed exhaust duct 80, either by another vacuum mechanism, or by some other means.

Once the lengths of microfilm 12 have been extracted from the cassettes 14, the cassettes 14 are then available for reuse with other lengths of microfilm 12. Using the device depicted in the drawings, each of the lengths of microfilm 12 can be very rapidly withdrawn from the reel 16 upon which it is mounted by means of the vacuum extraction system. Two hundred feet of microfilm can be concurrently withdrawn in six seconds from each of the six cassettes 14 that are positioned side by side on the shelf 26.

Undoubtedly, numerous variations and modifications of the invention will become readily apparent to those familiar with the processing and disposal of film. While the method and apparatus of the invention are particularly suitable for use in withdrawing microfilm from cassettes, both the apparatus and method of the invention can be applied to other systems in which film is wound on reels and stored in reusable cassettes. Accordingly, the scope of the invention should not be construed as limited to the specific apparatus depicted and implementation of the method described, but rather is defined in the claims appended hereto.

What is claimed is:

1. Apparatus for extracting film from a cassette containing a reel upon which a length of film is wound and disposed within a case having a film access opening and a reel drive access opening therein, comprising:
   case support means for supporting said case from beneath such that the axis of said reel is vertical,
   reel support means for supporting said reel within said case through said reel drive access opening so that said reel does not rest upon said case,
   vacuum means for applying a vacuum to said film so as to draw said length of film off of said reel and out of said case though said film access opening, thereby rotating said reel atop said reel support means.

2. Apparatus according to claim 1 wherein said case support means and said reel support means are adapted to concurrently support a plurality of said cases and said reels therewithin side by side, and said vacuum means is disposed so as to concurrently apply a vacuum to draw film out of all of said plurality of cases.

3. Apparatus according to claim 2 further comprising a hollow plenum coupled to said vacuum means and through which said vacuum means operates to draw said film out of said plurality of cases, and film shredding means located beneath said plenum.

4. Apparatus according to claim 1 wherein said reel support means is comprised of a horizontally disposed, disk-shaped bearing assembly projecting up from said case support means, said bearing assembly including a base, bearings disposed atop said base, and a turntable located atop said bearings, whereby said turntable is freely rotatable relative to said base.

5. A method for extracting microfilm from a cassette in which microfilm is wound on a reel that is located within a case having a microfilm access opening and a reel drive access opening, comprising:
   supporting said case from beneath so that the axis of said reel is vertical,
   supporting said reel from beneath through said reel drive access opening so that said reel does not rest upon said case, and
   applying a vacuum to said microfilm to thereby pull said microfilm out of said case through said microfilm access opening and off of said reel while rotating said reel about its axis.

6. A method according to claim 5 further comprising pulling said microfilm into an enclosure by means of said vacuum and shredding said microfilm in said enclosure.

7. A method of extracting film from a cassette which has a length of film wound on a reel that is disposed in a case having a film access opening therein comprising:
   mounting said case atop a case support such that the axis of said reel is vertical,
   elevating said reel within said case such that said reel does not rest on said case, and
   exerting a vacuum on said film, thereby drawing said film out of said case through said film access opening and rotating said reel.

8. A method according to claim 7 further comprising depositing said film in an enclosure.

9. A method according to claim 8 further comprising shredding said film in said enclosure.

* * * * *